United States Patent [19]

Van Gils

[11] Patent Number: 4,745,269
[45] Date of Patent: May 17, 1988

[54] METHOD OF IDENTIFYING OBJECTS PROVIDED WITH A CODE FIELD CONTAINING A DOT CODE, A DEVICE FOR IDENTIFYING SUCH A DOT CODE, AND A PRODUCT PROVIDED WITH SUCH A DOT CODE

[75] Inventor: Willibrordus J. Van Gils, Eindhoven, Netherlands

[73] Assignee: U.S. Philips Corporation, New York, N.Y.

[21] Appl. No.: 862,068

[22] Filed: May 12, 1986

[30] Foreign Application Priority Data

May 22, 1985 [NL] Netherlands .......................... 8501460

[51] Int. Cl.$^4$ ............................................. G06K 19/00
[52] U.S. Cl. ..................................... 235/487; 235/454
[58] Field of Search .................... 235/487, 454; 382/11

[56] References Cited

U.S. PATENT DOCUMENTS

| | | | |
|---|---|---|---|
| 4,132,976 | 1/1978 | Siegal | 382/11 |
| 4,263,504 | 4/1981 | Thomas | 235/487 |
| 4,275,381 | 6/1981 | Siegal | 382/11 |
| 4,596,038 | 6/1986 | Yoshida | 382/11 |
| 4,646,353 | 2/1987 | Tenge | 382/12 |

*Primary Examiner*—Harold I. Pitts
*Attorney, Agent, or Firm*—James J. Cannon

[57] ABSTRACT

For the purpose of identification, an object is provided with a code field containing a dot code. The code field possesses a certain degree of multiplicity of rotational symmetry (for example, 2, 3, 4, 6). The code field contains information dots from which its orientation can be detected. Redundancy is added which includes the orientation information, so that a certain degree of error correction is possible. By way of example, a suitable code is given for rotationally symmetric objects on which there is not enough space for a bar code.

7 Claims, 8 Drawing Sheets

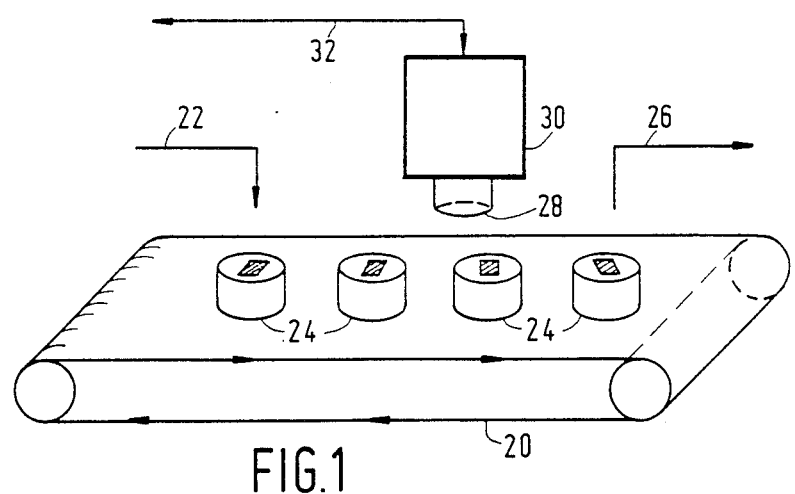
FIG.1
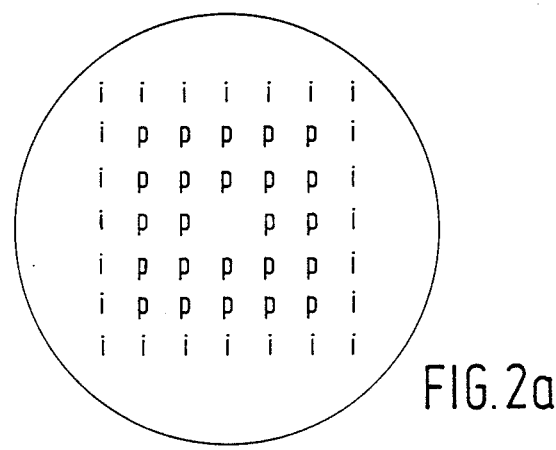
FIG.2a
FIG.2b
FIG.2c

|     |     |     |     |     |     |     |
|-----|-----|-----|-----|-----|-----|-----|
| i 0 | i 23 | i 22 | i 21 | i 20 | i 19 | i 18 |
| i 1 | p 0 | p 21 | p 20 | p 19 | p 18 | i 17 |
| i 2 | p 1 | p 4 | p 23 | p 22 | p 15 | i 16 |
| i 3 | p 2 | p 5 |     | p 17 | p 14 | i 15 |
| i 4 | p 3 | p 10 | p 11 | p 16 | p 13 | i 14 |
| i 5 | p 6 | p 7 | p 8 | p 9 | p 12 | i 13 |
| i 6 | i 7 | i 8 | i 9 | i 10 | i 11 | i 12 |

FIG. 3

$$G = \begin{bmatrix} A_{11} & A_{12} & \cdots & A_{1s} & \underline{d_1} \\ A_{21} & A_{22} & \cdots & A_{2s} & \underline{d_2} \\ \vdots & \vdots & & \vdots & \vdots \\ A_{p1} & A_{p2} & \cdots & A_{ps} & \underline{d_p} \\ B_{11} & B_{12} & \cdots & B_{1s} & \underline{e_1} \\ \vdots & \vdots & & \vdots & \vdots \\ B_{q1} & B_{q2} & \cdots & B_{qs} & \underline{e_q} \\ C_{11} & C_{12} & \cdots & C_{1s} & \underline{f_1} \\ \vdots & \vdots & & \vdots & \vdots \\ C_{r1} & C_{r2} & \cdots & C_{rs} & \underline{f_r} \end{bmatrix}$$

FIG. 6

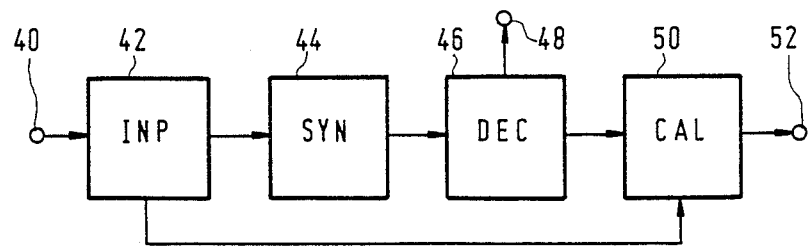

1. Input $(r1(x), r2(x))$;
2. Compute the syndrome
$$s1(x) = r1(x) \quad + r2(x)\bar{a}(x)$$
$$s2(x) = r1(x)a(x) + r2(x);$$
3. If $wt(s1(x)) \leq t$ then $\hat{e}1(x) = s1(x)$ else
4. if $wt(s2(x)) \leq t$ then $\hat{e}1(x) = 0 \quad$ else

--- --- --- --- --- --- --- --- --- --- --- --- --- --- --- --- --- --- --- ---

$(t \geq 2:)$
5. if for some $j = 0, 1, \ldots, 23$, $wt(s1(x) + x^j \bar{a}(x)) \leq t-1$
   then $\hat{e}1(x) = s1(x) + x^j \bar{a}(x)$ else

--- --- --- --- --- --- --- --- --- --- --- --- --- --- --- --- --- --- --- ---

$(t \geq 3:)$
6. If for some $j = 0, 1, \ldots, 23$, $wt(s2(x) + x^j a(x)) \leq t-1$
   then $\hat{e}1(x) = x^j$ else

--- --- --- --- --- --- --- --- --- --- --- --- --- --- --- --- --- --- --- ---

$(t \geq 4:)$
7. If for some $i, j = 0, 1, \ldots, 23, i \neq j$, $wt(s1(x) + (x^i + x^j)\bar{a}(x)) \leq t-2$
   then $\hat{e}1(x) = s1(x) + (x^i + x^j)\bar{a}(x)$ else

--- --- --- --- --- --- --- --- --- --- --- --- --- --- --- --- --- --- --- ---

$(t \geq 5:)$
8. If for some $i, j = 0, 1, \ldots, 23, i \neq j$, $wt(s2(x) + (x^i + x^j)a(x)) \leq t-2$
   then $\hat{e}1(x) = x^i + x^j$ else

--- --- --- --- --- --- --- --- --- --- --- --- --- --- --- --- --- --- --- ---

9. detection of an error.

FIG.5

METHOD OF IDENTIFYING OBJECTS PROVIDED WITH A CODE FIELD CONTAINING A DOT CODE, A DEVICE FOR IDENTIFYING SUCH A DOT CODE, AND A PRODUCT PROVIDED WITH SUCH A DOT CODE

BACKGROUND OF THE INVENTION

1. Field of the Invention

The invention relates to a method of identifying objects provided with a code field containing a dot code, which code field can be presented in different positions to a pick-up device. The identification can be an individual amount of information for the relevant object or an amount of information for a group of objects. In a manufacturing process such an identification can be advantageous with a view to inventory control, or for associating an object with test results applicable to it. The identification may also indicate a test result relating to an earlier manufacturing step.

2. Description of the Prior Art

The use of a so-called bar code is now general practice. This code works very reliably, but takes up a large area on the object. A dot code is disclosed in the United States patent No. 4,263,504. In themselves, dots take up less space than bars. The known dot code is used for coding alphanumeric characters, a cyclically transposable codeword being used for each character. Each character fills a column of the code field wherein the relevant codeword is applied twice in succession. For this reason the detection is largely independent of the position of the pick-up window along the column of characters.

It is evident that the known art still requires a large area for the identification. As an initial improvement of the known method a code field is therefore taken with dimensions that are of the same order of magnitude in both coordinate directions. In particular the code field then has a shape that possesses a certain degree of rotational symmetry, for example twofold (rectangle), threefold, fourfold or sixfold. (Other multiples are also possible.) In this case, then, the code field has to contain orientation information. The known code, however, is not proof against multilations: a wrongly read dot also implies an erroneous identification and possibly therefore a wrong orientation.

SUMMARY OF THE INVENTION

It is thus an object of the invention to improve the method mentioned in the preamble in such a way as to provide a certain degree of error correction so that the identification is made insensitive to a certain degree of multilation and the orientation information too can be corrected. The invention achieves the aim through the characteristic that, if the aforesaid positions are realized by different orientations because the code field possesses rotational symmetry, use is made of an error-correcting code, each codeword of which consists of bit groups each containing as many bits as correspond to the multiplicity of the rotational symmetry, whereby each bit group occupies an associated group of dot positions, which group of dot positions also possesses said rotational symmetry, such that by rotation of the code field the combined contents of the bit groups always form a codeword, said codeword also containing bits that indicate the angle of orientation of the code field, and that for identification the dot information is first picked up, after which a codeword is reconstructed from the picked-up information and at least one bit of wrong information is corrected if possible and necessary, after which the orientation of the code field is determined, and by means of the orientation information a non-redundant partial content of the codeword is derived from the reconstructed codeword and made available as identification to a user.

The multiplicity of the code should preferably be equal to four. A typical application of the invention is found when the code is applied across the end of a rotationally symmetric object or across a rotationally symmetric part of an object, such as for example a rotary shaft. The space available will then often be small. The code can be applied to the code surface itself by for example etching, selective sand-blasting or burning in. It may also be applied by means of a sticker. The code may be optically scanned, but may also be scanned in some other way, for example magnetically. An advantage of a dot code is that the use of dots as functional elements is relatively rare. This makes it readily possible for example to idenfify a circuit board (substrate-wafer) in an integrated circuit production line: dot-shaped diffusion or other patterns are hardly ever used for the functional elements of such circuits. This make it easy to find the code field, which can therefore be done automatically.

It is advantageous if the bits that indicate the orientation of the code field are independent of the identification information in the codeword and if, after the orientation has been determined, a standard orientation is then first established in order that, possibly after cyclic rotation of the reconstructed codeword, a non-redundant part thereof can be made available as identification. If a number of bits are used solely for indicating the orientation, this orientation information is omitted from the reconstructed codeword, which makes the processing simpler than if the reconstructed codeword has to be decoded by means of source decoding. The achievement of this means that the information efficiency of the code bits is slightly lower.

Further advantageous embodiments are mentioned in the dependent claims.

The invention also relates to a device for identifying a dot code of the kind described, and to a product provided with such a dot code.

DEFINITION

A dot is understood to be a local area on a surface (physical or apparent) whose dimensions in two orthogonal coordinate directions along the surface do not differ by more than a factor of two, which area is small compared with the dimensions of the code field, and substantially the whole of which area may a priori be of one particular color, or of a color differing therefrom. The dot can thus be black or white, but other colors may also be applicable. The invention can also be used for a code in which there are dots in two dimensions, thus for example large dots and small dots. A part of the code field is reserved for each dot, whether present or not.

BRIEF DESCRIPTION OF THE DRAWINGS

Further details of the invention will be given with reference to the following figures:

FIG. 1 shows a system in accordance with the invention.

FIGS. 2a, 2b, 2c show examples of code fields with fourfold symmetry.

FIG. 3 shows an example of the positioning of identification bits and redundancy bits in the code field given in FIG. 2a.

FIGS. 4a, 4b, 4c show some examples of the code field when the rotational symmetry is not fourfold.

FIG. 5 shows a decoding strategy.

FIG. 6 shows a generally applicable codeword generator matrix.

FIG. 7 shows a block diagram of a device in accordance with the invention.

DESCRIPTION OF THE PREFERRED EMBODIMENT

Figure 8A:
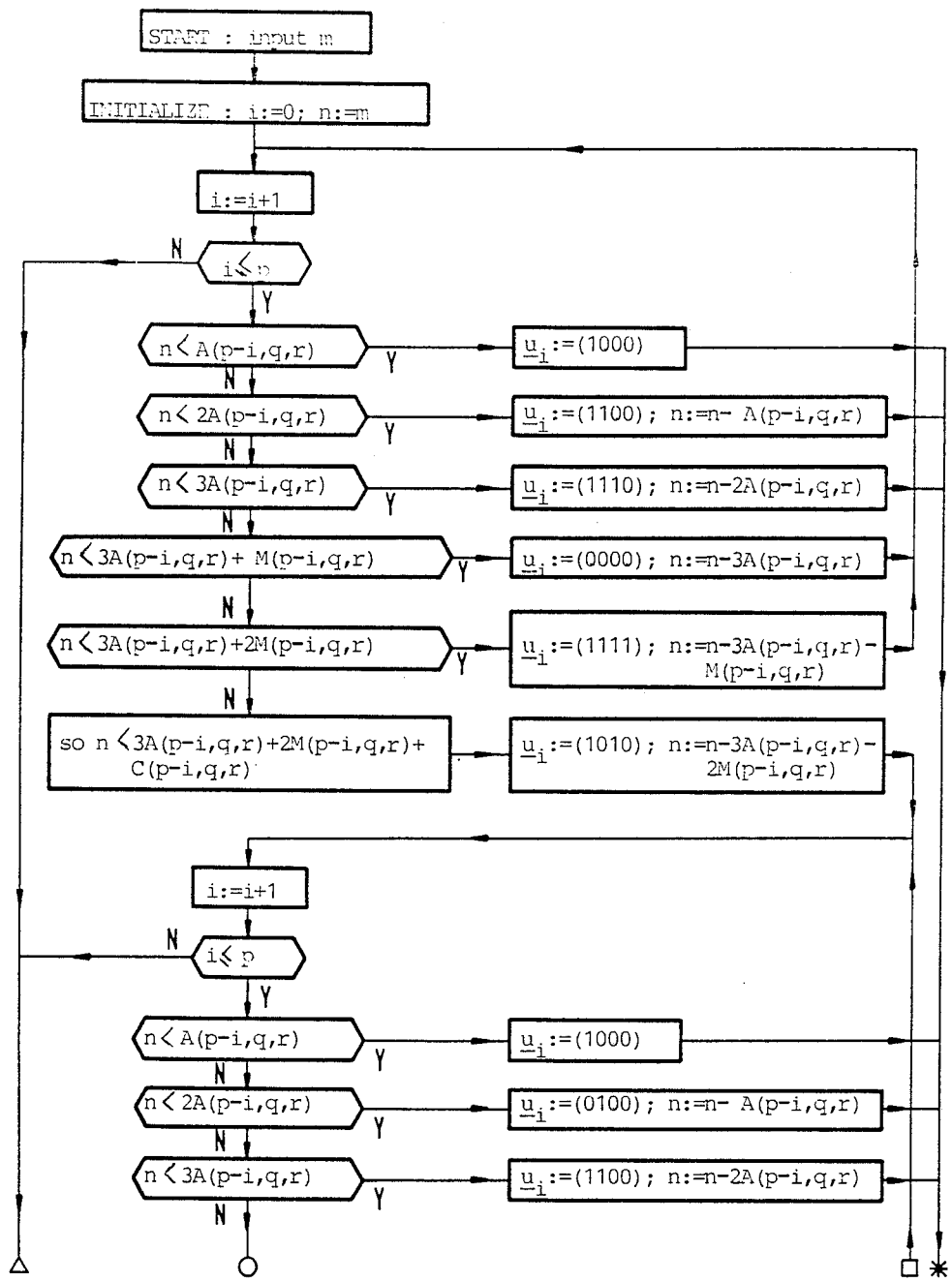
FIGS. 8a, 8b show the coding for an optimum source code.

FIG. 1 shows an example of a device in accordance with the invention. A means of transport is present, in this example a conveyor belt 20 driven as indicated by the arrows. A feed means 22 is present, indicated by only one arrow, and a means for removal 26 indicated by only one arrow. The latter means may be grippers, but the invention does not relate to these. Thus, the objects 24 are placed on the means of transport and subsequently removed from it. A characteristic case is found when the orientation of the objects has not been controlled and is therefore a priori not known. The objects carry a code field which is shown dark and is rectangular or lozenge-shaped, or some other figure with a certain degree of rotational symmetry (for example an equilateral triangle or a regular hexagon), but preferably square. The objects are drawn rotationally symmetric in shape. Another possibility is that the object does not possess rotational symmetry, and can thus without visual feedback be positioned in a predetermined manner by the feeder 22, but that the code field is applied to a rotatable part, for example the top end of the shaft of an electric motor.

Element 28 is an optical system, lens system, diaphragm, slit and suchlike, by means of which an image of the code field is formed on the sensor that forms part of block 30. This detects the code bits on the code field, but for the sake of simplicity will not be further discussed. As a result, apart from the influence of the code field orientation, the so-called channel word consisting of channel bits is known. From the channel (code) word the source codeword is reconstructed in a first decoding operation. Then the redundancy that serves for producing the error correction is removed and a correction is carried out where possible and necessary. In a second decoding operation the actual user information is derived from the source codeword. In certain embodiments these two steps cannot be separately distinguished. The decoding will be discussed later. Further, the data-processing elements in block 30, not specially indicated, communicate with other data-processing user devices via line 32. The data obtained can be used in quality control, process monitoring in a manufacturing process comprising the system shown, or in some other way.

FIG. 2a gives an example of a code field for use with the invention, drawn on a surface possessing rotational symmetry, for example the earlier memtioned shaft. The code field has 7×7=49 dot positions. The dots may be applied, as desired, by etching, sand-blasting, with paint, on an identification sticker or in some other way. The first problem to be solved is the detection of the orientation. This can be done by means of three dots situated at the corners of a square, for example on the corner positions of the code field. The dots situated at adjoining corners then have a first bit value, the third has the other value (the dot at the fourth corner can have any arbitrary value). Other codings of the occupied positions often cost more dots.

Figure 8B:
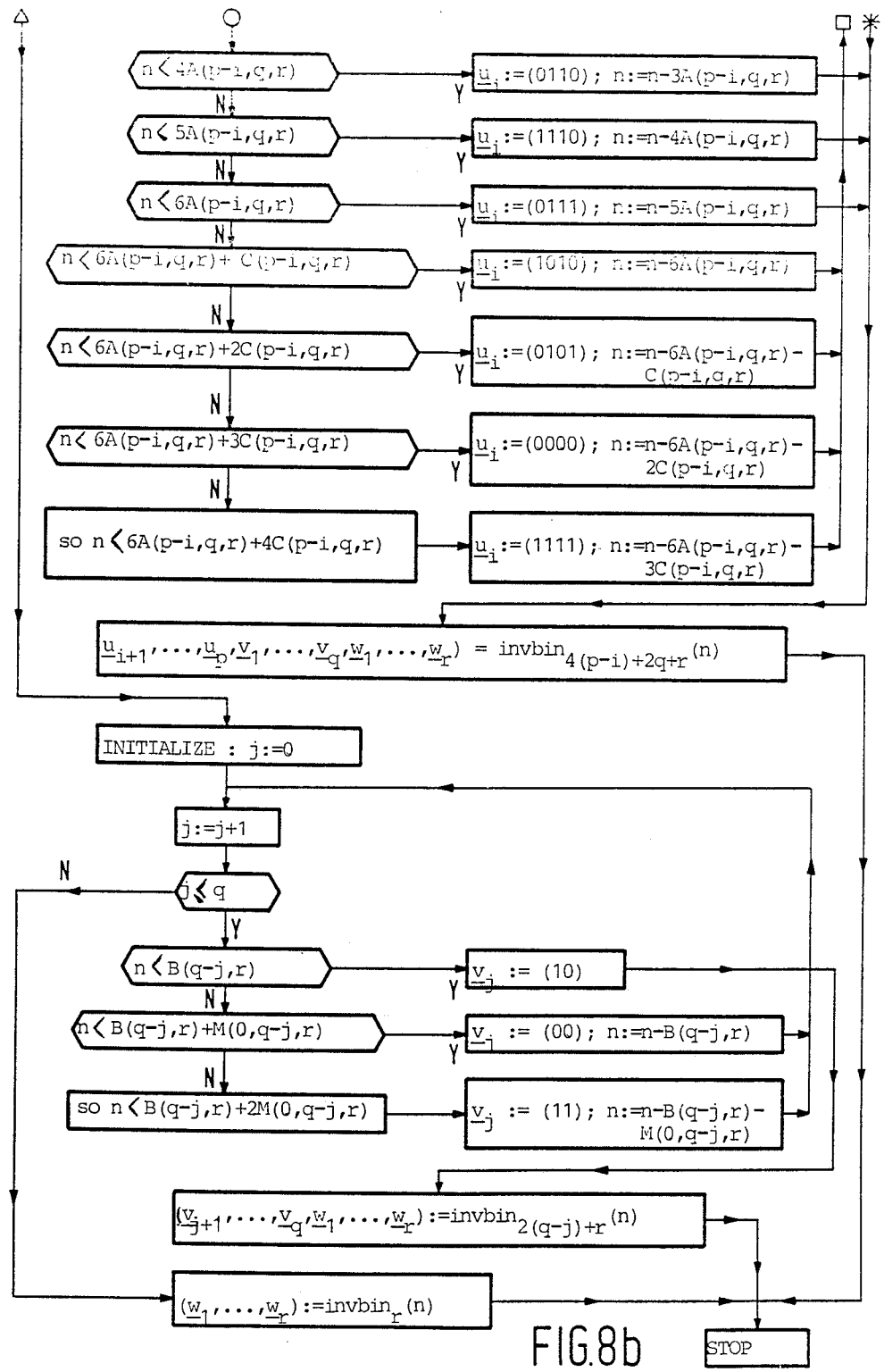

An essentially more economical code is described with respect to FIGS. 8a, 8b, where the orientation coding can be performed with fewer than two bits. A drawback is that the decoding in this case is more complicated. The described manner of coding the orientation by means of three dots can also be applied if the code field is an equilateral triangle. The coding can also be done, however, with two bits at the corners with mutually opposite values. For other patterns possessing rotational symmetry other orientation codes are applicable. For a rectangle, which possesses only two mutually exchangeable orientations, only two corner positions opposite one another in the code field need to be coded. For an equilateral hexagon there are six mutually exchangeable orientations. The six corner positions of the code field are then coded as follows: three consecutive positions are given a first value, the fourth one receives the other value, while the last two may be given any arbitrary value.

Of the 49 dots in FIG. 2a there are 46 available for containing identification information. A user has asked for the possibility to be created for $2.10^6$ arbitrary items of identification information. For this purpose 21 dot positions suffice. Three positions are used for the orientation information as described. Twenty-four positions are used for redundancy bits in order that the mutilation of some dots without loss of information can be tolerated. The dot positions indicated by an i contain information; the bits indicated by a p are redundancy bits, so that a code is obtained with a minimum Hamming distance between the codewords of 12. In this way, a maximum of t bit errors can be corrected and 11-t bit errors detected. The value of t may be freely chosen in the closed interval (0 ... 5). The one dot position not indicated is left open in the exemplary embodiment and not used.

The redundancy bits protect all information bits, thus including identification bits and the bits that give the orientation. The special feature of the code to be explained in the following is that rotation of the code field through 90° or a multiple thereof still produces a valid codeword that is again protected against errors in the same way. This means that first the codeword can be read out and, where necessary and possible, corrected before the orientation of the code field need be known. It should be noted here that the "orientation bits" may be placed at other positions provided that the figure formed by these positions possesses the same exchangeable orientations as the entire code field. The code as used here is called a double-circulant code. The dimensions of the code field may be different, and in certain cases it is possible to use the central bit positions as well.

FIGS. 2b, 2c give other examples of code fields with fourfold rotational symmetry as variants of FIG. 2a. The bit group used for the orientation information is shown separately. In FIG. 2c the positioning of this group does have rotational symmetry but not mirror symmetry.

FIG. 3 shows an example of the positioning of identification bits and redundancy bits in the code field according to FIG. 2a. The information bits are numbered i0 . . . i23. The bits i0, i6, i12, i18 form a circulant group with fourfold cyclic character. So too does the bit group (i1, i7, i13, i19) and so on up to (i5, i11, i17, i23). The redundancy bits are numbered p0 . . . p23. From the redundant bits cyclic groups are formed having the same bit numbers as for the information bits. FIG. 4a shows a code field with twofold rotational symmetry in the form of a rectangle. FIG. 4b shows a code field with twofold rotational symmetry in an elliptical form, both for the same numbers of bits as FIG. 2a. FIG. 4c shows a code field with threefold rotational symmetry for a (46, 21) code. The relevant code itself is not further specified for the sake of simplicity. FIG. 4d shows a code field with sixfold rotational symmetry for a (37,18) code. For the sake of simplicity the code itself is not further specified.

A code pertaining to FIG. 3 is described below by way of example. The codeword is formed as follows. There are 24 information bits (m0 . . . m23); the parity bits are formed as follows:

$$pi = \sum_{j=0}^{23} mj \cdot a(i-j) = m0 \cdot ai + m1 \cdot a(i-1) + \ldots + mi \cdot a0 + \ldots m23 \cdot a(i-23),$$

where the indicces are added modulo-24 and the bits are added modulo-2. The vector a which determines the coefficients aj(j=0.23) is:

1101,0101.1110.1001.0111.1001=HEX D5E 979.

The codewords satisfy the equation: c=m(IA), where I is the 24×24 identity matrix. The matrix (A) has the vector a as its top row, while each subsequent row is equal to the one immediately preceding it shifted cyclically over one position to the right. A matrix (A) of this kind is called circulant. The identity matrix is thus also circulant. For this reason the code generated by (G)=(IA) is called double-circulant, since this generator matrix consists of two parts each of which is curculant in itself. Consequently each cyclic rotation of the information parts and the redundancy parts always gives a second codeword following the first.

In FIG. 3 a rotation of the code field through 90° maps the codeword (m, p) on to the word (m', p'), whereby mi'=m(i-6) and pi'=p (i-6) invariably applies too all i(0 . . . 23). Contrary to the foregoing, the non-redundant bits are denoted by m. The code has the property referred to as quadratic cyclicity. The orientation bits have for example the values: m0=1, m6=1, m12=0.

The weight wt(x) of a vector x consisting of bits is defined as the number of vector bits with value 1. The distance d(x, y) between two of such vectors is defined as the number of positions on which they have different elements, which distance is thus the same as the weight of the difference vector. The code discussed above has a minimum distance of 12 between two codewords. It can be proved that, with the given numbers of bits, no larger minimum distance can be realized. This code can therefore be used in different modes:

(a) correcting patterns of at the most five bit errors and also detecting patterns of 6 bit errors;
(b) correcting patterns of at the most four bit errors and also detecting patterns of 5, 6 and 7 bit errors;
(c) correcting patterns of at the most three bit errors -continued and detecting patterns of 4, 5, 6, 7, 8 bit errors, and so on up to

.
.
.

(f) detecting without correcting patterns of at the most eleven bit errors.

A parity check matrix is (H)=($A^T$I), where ($A^T$) is the transposed matrix of (A). A special feature of the case described is that the generator matrix is also a parity check matrix. The weights of the codewords are furthermore all divisible by 4 and $A^T = A^{-1}$, that is to say the transposed of A is equal to the inverse of A.

In itself this code is known from the book by F. J. MacWilliams et al: The theory of error correcting codes, North Holland, Amsterdam, 1978. This reference does not give the advantageous use of such a code as described here.

For decoding, the syndrome is generally determined. From this an estimate is made of the correctable error pattern with minimum weight which the relevant syndrome might have caused. Let the codeword be: c=(m, p). Let the error pattern be: e=($e_1$, $e_2$). Let the detected word be: r=($r_1$,$r_2$)=(m+$e_1$, p+$e_2$). A (redundant) parity matrix is:

$$H = \begin{pmatrix} I & A \\ A^{-1} & I \end{pmatrix}$$

The syndrome is then found as:
S=($s_1$, $s_2$)=(($e_1^T$+A$e_2^T$), ($A^{-1}e_1^T$+$e_2^T$)).
Here the vector b=(b0 . . . b23) is identified with the polynominal b(x)=(b0+b1x+b2x+$^2$ . . . +b23$x^{23}$).

The calculations are performed modulo ($x^{24}-1$). Consequently a cyclic shift to the right over one position corresponds to a multiplication of the relevant polynominal by x, a shift over two positions corresponds to a multiplication by $x^2$, and so on. The $i^{th}$ row of the matrix (A) thus corresponds to $x^{i-1}a(x)$ and A corresponds to:

$$A = \begin{matrix} a(x) \\ xa(x) \\ \cdot \\ \cdot \\ \cdot \\ x^{23} a(x) \end{matrix}$$

The matrix $(A)^{-1}=(A^T)$ is again circulant, having as its top row a0, a(23), a(22) . . . a1, corresponding to ā(x): $x^{24}a(x^{-1})$. The syndromes correspond to:
s1(x)=e1(x)+e2(x)ā(x)
s2(x)=e1(x)a(x)+e2(x).
The weight of the polynomial b(x)=b0+b1x+ . . . b23$x^{23}$ is defined as the number of components bi (i=0 . . . 23) with the value 1. In this connection FIG. 5 gives a decoding algorithm as an example. The code thus corrects t errors and detects (11-t) errors. The elementary operations in the execution of the algorithm are:
shifting a vector (with circular retro coupling)
adding two vectors with bitwise Exclusive/OR determination
determining the weight of a vector.

In a first step the input quantities are fed in. In the second step the symdrome quantities are determined. In step 3 an estimated error pattern is determined from the first syndrome quantity of its weight if sufficiently small. If on the other hand the weight of the second symdrome quantity is sufficiently small (and the first one was not), then the estimated error pattern is equal to zero. If errors need only to be detected, this is done after step 2: because $s_1 \neq 0$. In step 5 an estimated error pattern is determined from a modified first syndrome quantity of the weight of the latter if sufficiently low. In some circumstances 24 modified syndrome quantities have to be determined for that purpose. The steps 6, 7, 8 are performed in a manner corresponding to that of step 5. For $t=4$ it is not necessary to perform step 8. For $t=3$, steps 7, 8 do not have to be performed. For $t=2$, steps 6 . . . 8 do not have to be performed. If in spite of modification of the syndrome quantities no sufficiently small weight is found, error detection takes place in step 9, that is to say that the error pattern is regarded as uncorrectable. Measures to be taken thereafter, such as rereading of the code, and measures connected with the routing of the object, do not come within the ambit of the present invention.

In general, coding is done in two conceptually distinct steps:
(a) in a source encoding certain numbers (identifiers) are encoded in a set of binary numbers that satisfy specified conditions.
(b) in a channel encoding these binary numbers are encoded with encoding matrices such that random errors can to some extent be corrected. For simplicity, only square matrices with fourfold rotational symmetry will be considered.

The code is applied to the product, and after readout the decoding takes place in the reverse sequence. The two coding steps and decoding steps, respetively, can in fact be performed together.

The generator matrix of the code has the general form shown in FIG. 6. Here n, the number of code bits in a codeword, is the length of the code. The dimension of the code is given by k, the number of non-redundant bits that can be extracted from a codeword. The numbers p, q, r, s are natural numbers or zero, where: $k=4p+2q+r$, and $n=4s+1$. One can also have $n=4s$, but in that case the last column is omitted. The latter means then that the central dot position is not used. The matrices A are $4\times 4$ circulant matrices, B likewise $2\times 4$ and C likewise $1\times 4$. The column vectors d, e, f consist either entirely of ones or entirely of zeros, and have fitting dimensions in the respective rows of matrices. The codes that can thus be generated are called square-cyclic codes. The parity check matrix of a square-cyclic code has the same form as the generator matrix in FIG. 6. A code is called quasi-cyclic if there is an integer $V>1$ such that each cyclic shift over V positions of a codeword results in another codeword. If $V=1$ the code is cyclic.

If the length of the codeword amounts to four times the quantity V, then one can find from the generator matrix of such a quasi-cyclic code, which is in itself known, a generator matrix that consists solely of circulant matrices. And these circulant matrices can be divided into smaller circulant matrices (provided sufficient matrix elements are available). If the dimensions of the circulant matrices fulfil the properties discussed, the generator matrix thus found can be transformed into that of FIG. 6. Examples of codes that can be transformed in this way havee been given by:
a. CL. Chen et al., "Some results on quasi-cyclic codes", Inform. Contr. 15 (1969) p. 407–423;
b. R. A. Jenson, "A double Circulant Presentation for quadratic residue codes", IEEE.. Tr. Inf. Th., IT 26 (1980) p.223–227;
c. M. Karlin, "Decoding of circulant codes", IEEE Tr. Inf. Th., IT 16 (1970) p.797–802;
d. S. E. Tavares et al., "Some rate p/p+1 quasi-cyclic codes", IEEE Tr. Inf. Th., IT 20 (1974) p.133–135;
e. H. van Tilborg, "On quasi-cyclic codes with rate t/m", IEEE Tr. Inf. Th., IT 24 (1978) p.628–630.

For the sake of simplicity, these codes will not be discussed in further detail. The transformation is done by the interchanging of columns of the generator matrix. In this process the rows of the generator matrix are interchanged in exactly the same manner. The final result is a matrix of the general type shown in FIG. 6. The use of the known codes in an environment like that of the present invention is not given in the references cited here.

In the case of quasi-cyclic codes with the proper ratio between the codeword length and the above-described quantity V the transformation into a square-cyclic code is an elementary operation in the invention. Often, however, advantageous use can be made of cyclic or shortened cyclic codes for transformation into square-cyclic codes. The partitioning of generator matrices and parity matrices of cyclic codes into circulant matrices has been described in the article by C. W. Hoffner et al. "Circulant bases for cyclic codes", IEEE Tr. Inf. Th., IT 16 (1970) p.511–512. For the sake of brevity, this mechanism will not be further described in the present description. When a parity check matrix according to FIG. 6 has been found in this way, a new parity check matrix with the same properties can be found by omitting fours of columns, so that these fours relate to cyclic subgroups of code bit. Such a shortening of the codeword offers better matching to the dimensions of the code field.

The following advantageous codes have been found, only those codes being considered whose length is less than 100.
(a) With submatrices of maximum dimensions $4\times 4$. The maximum length of the codeword is now $2^4 - 1 = 3\times 5$. The cyclotomic cosets modulo 15 are:
$c0 = (0)$
$c1 = (1, 2, 4, 8)$
$c3 = (3, 6, 12, 9)$
$c5 = (5, 10)$
$c7 = (7, 14, 13, 11)$.

A cyclotomic coset of this kind is found by repeatedly doubling the rank number of a column of the parity matrix modulo 15. The relevant rank numbers in a cyclotomic coset are grouped together, giving three groups of four, one of two and one of one. The columns with rank numbers in c5 are omitted from the parity check matrix since there are only two. This gives a parity matrix of a quadratic-cyclic code with length 13. If we do this for the cyclic codes of length 15 and maximum value of the minimum Hamming distance, we obtain quadratic-cyclic codes with the parameter values:

| n-k | d | d' |
|-----|---|----|
| 4 | 3 | 3 |
| 5 | 4 | 4 |
| 6 | 4 | 3 |
| 7 | 4 | 4 |
| 8 | 5 | 5 |
| 9 | 6 | 6 |

Here d gives the minimum distance, d' the same when using the known decoding algorithm of BCH codes.

(b) With submatrices of maximum dimensions $8 \times 8$ the maximum length of the codeword is $2^8 - 1 = 3 \times 5 \times 17$. Consider the cyclic codes of lengths 51, 85. The cyclotomic cosets modulo n then have 1, 3, 4 or 8 elements. The columns with a rank number in a cyclotomic coset that contains two or four elements are omitted from the parity check matrix. In groups of rows and groups of columns of dimension 8 the rows and columns are then regrouped into the rank order: 1, 3, 5, 7, 2, 4, 6, 8. In a row group of dimension 4 the rows are regrouped into the rank order 1, 3, 2, 4. In this way parity check matrices of quadratic-cyclic codes are formed. With length 51 the following result is obtained (Note that there are six cyclotomic cosets modulo 55 with 8 elements and one with two elements):

| n | n-k | d | d' | n-k | d | d' |
|---|-----|---|----|----|---|----|
| 49 | 8 | 3 | 3 | 19 | 6 | 6 |
|  | 9 | 4 | 4 | 24 | 9 | 9 |
|  | 10 | 4 | 3 | 25 | 10 | 10 |
|  | 11 | 4 | 4 | 26 | 10 | 9 |
|  | 16 | 5 | 5 | 27 | 10 | 10 |
|  | 17 | 6 | 6 | 32 | 14 | 11 |
|  | 18 | 6 | 5 | 33 | 14 | 14 |

A similar procedure applies to the cyclic codes of length 85.

(c) With submatrices of maximum $12 \times 12$ the maximum length of the codeword is $2^{12} - 1 = 3^2 \times 5 \times 7 \times 13$. Codewords that are not too long have a length in the row (35, 39, 45, 65, 91). The cyclotomic cosets modulo n then contain 1, 2, 3, 4, 6 or 12 elements. The cyclic codes are shortened by omitting column groups of 2, 3 and 6 elements. In the resulting parity check matrices the rows and columns are rearranged as follows. In groups of 12 rows and columns according to 1, 4, 7, 10, 2, 5, 8, 11, 3, 6, 9, 12. In groups of rows and columns of dimension 4 they are rearranged according to 4, 3, 2, 1. In groups of rows of magnitude 6 the rows are rearranged according to 1, 4, 2, 5, 3, 6. The resulting matrices are parity check matrices of square-cyclic codes.

(d) With submatrices of maximum $16 \times 16$ the maximum length of the codeword is $2^{16} - 1 = 3 \times 5 \times 17 \times 257$. This only gives codes that have been found hereinbefore.

(e) With submatrices of maximum $20 \times 20$ the maximum length of the codeword is $2^{20} - 1 = 3 \times 5^2 \times 11 \times 31 \times 41$. Not too long code words have lengths of 41,55,75. The cyclotomic cosets have 1, 2, 4, 10 or 20 elements. The cyclic codes are shortened by omitting the columns in groups of 2 or 10 elements from the parity check matrix. In the resulting parity check matrices the rows and columns are rearranged as follows. In row and column groups of dimension 20 the rows and columns are rearranged as follows:

1, 6, 11, 16, 2, 7, 12, 17, 3, 8, 13, 18, 4, 9, 14, 19, 5, 10, 15, 20.

In row groups with dimension 10 the rows are rearranged as follows: 1, 6, 2, 7, 3, 8, 4, 9, 5, 10. The resulting matrices are parity check matrices of square-cyclic codes.

(f) With submatrices of maximum $28 \times 28$ it appears that 87 is a factor of $2^{28} - 1$. There are three cyclotomic cosets modulo 87 with 28 elements and one with two elements. We shorten the cyclic codes of length 87 by omitting the columns in groups of two from the parity check matrix. In row groups and column groups of 28 the rows and columns are rearranged as follows:

1, 8, 15, 22, 2, 9, 16, 23, 3, 10, 17, 24, 4, 11, 18, 25, 5, 12, 19, 26, 6, 13, 20, 27, 7, 14, 21, 28. The resulting matrices are parity check matrices of square-cyclic codes.

(g) With submatrices of maximum $36 \times 36$ it appears that 95 is a factor of $2^{36} - 1$. There are two cyclotomic cosets modulo 95 with 36 elements, one with 18 elements, and one with four elements. We shorten the cyclic codes of length 95 by omitting columns in groups of 18 from the parity check matrix. In the resulting parity check matrices the rows and columns, respectively, of row groups and column groups of dimension 36 are rearranged as follows: 1, 10, 19, 28, 2, 11, 20, 29, ..., 9, 18, 27, 36. The rows in the row group of dimension 18 are rearranged according to 1, 10, 2, 11, 3, 12, ..., 9, 18. The resulting parity check matrices are parity check matrices of square-cyclic codes of length 77.

(h) With submatrices of maximum $48 \times 48$ it appears that 97 is a factor of $2^{48} - 1$. There are two cyclotomic cosets with 48 elements. In the parity check matrix the rows and columns in row and column groups of dimension 48 are rearranged as follows: 1, 13, 25, 37, 2, 14, 26, 38, ..., 12, 24, 36, 48. The resulting matrices are parity check matrices of square-cyclic codes of length 97.

(i) A specific example is the following: we take the BCH code with length $255 = 2^8 - 1$. The primitive polynomial $x^8 + x^4 + x^3 + x^2 1$ has a primitive root a, and the base $B5 = (a^5, a^{10}, a^{20}, a^{40}, a^{80}, a^{160}, a^{65}, a^{130})$ is a normal base of the Galois field $GF(2^8)$, relative to $GF(2)$. The elements of $GF(2^8)$ are represented by binary octuples relative to the base B5. The cyclic codes are shortened by omitting column groups of four in the parity check matrix given in FIG. 6 as well as the column group of two columns. In the resulting parity check matrices column groups and row groups of dimension 8 are rearranged as follows: 1, 3, 5, 7, 2, 4, 6, 8. For rows in row groups of dimension 4 the ordering is as follows: 1, 3, 2, 4. The resulting code length is 241. This gives the following values for (n, k, d): (241, 233, 3), (241, 225, 5), (241, 217, 7), (241, 209, 9) and so on. Further shortening is also possible.

FIG. 7 gives a block diagram of a device in accordance with the invention. Input 40 is connected to the output of the pick-up in FIG. 1. Element 42 is a preprocessing and storage element for the possibly deformed codeword. The pick-up scans the code field. In a first arrangement the coordinates of the rows and columns of dots are determined and this coordinate system is then subjected to parallel scanning. It is also possible to scan a fixed world-coordinate system, so that a program-controlled rotation of the image has to be performed until one of the four interchangeable orientations of the code field is obtained. For the sake of brevity this control system will not be described. In block 42 the codeword is stored. In block 44 the syndrome quantities are determined. In block 46 decisions are taken about the strategy to be employed on the basis of the weights calculated therein of non-modified syndrome quantities contained there. At the output 48 an error signal may appear. In block 50 the detected codeword is corrected on the basis of the possibly modified syndrome quantities and the original information. The user information may then be selected and presented at output 52, if necessary after rotation of the codeword has taken place by means of the position-indication bits.

A description has already been given a method of determining orientation, in which three dot positions were used.

A more efficient procedure is possible, however. It is referred to as optimal source coding and translates M identification numbers into as many channel messages. This set of channel messages is a special collection of all possible binary vectors of length K (K is the dimension of the channel code).

Suppose we are using a channel code with a generator matrix as in FIG. 6. The dimension K is thus equal to $4p+2q+r$. A channel message m thus appears as $m=(u_1|u_2|\ldots|u_p|v_1|v_2|\ldots|v_q|w_1|w_2|\ldots|w_p)$ where $u_1 \ldots u_p$ are binary vectors of length 4, $v_1 \ldots v_q$ are binary vectors of length 2, and $w_1 \ldots w_r$ are binary vectors of length 1. The function R(.) applied to m is defined as the simultaneous cyclic shift over 1 position to the right of all parts $u_1 \ldots u_p\ v_1 \ldots v_q\ w_1 \ldots w_r$ of m. Thus, if the codeword C (in matrix form) corresponds to the channel message m, then the rotation of C over 90° corresponds to R(m).

We say that two vectors $m_1$ and $m_2$ of length $k=4p+2q+r$ are equivalent when, after several applications of R, $m_1$ changes to $m_2$, that is to say: $R^i(m_1)=m_2$ for $i=0, 1, 2,$ or 3.

This equivalence relation divides the set of binary vectors of length $k=4p+2q+r$ into a number of so-called equivalence classes. This means to say that the class which contains m is equal to (m, R(m), R²(m), R³(m)). An equivalence class contains 1, 2 or 4 elements. In total there are M(p,q,r): $=2^{4p+2q+r-2}+2^{2p+2q+r-2}+2^{p+q+r-1}$ different equivalence classes.

From each equivalence class we now choose exactly one representative (to be described in more detail) and these M(p,q,r) representatives constitute the set of channel messages.

In this manner we can thus code precisely M(p,q,r) identification numbers. For of course, all possible rotations of a codeword have corresponding binary vectors of length K which all belong in the same equivalence class. A codeword and its rotations thus have a corresponding, unique identification number.

What does the set of channel messages, or the set of representatives of equivalence classes, look like?

All channel messages are generated by the alogrithm in FIG. 8a, 8b by letting m run through the numbers 0 to M(p,q,r)−1. For example,
$m=(u_1|\ldots|u_p|v_1|\ldots|v_q|w_1\ldots|w_r)$ All m with $U_1=(1000)$ and the remainder, arbitrarily, are channel messages.

All m with $u_1=(1100)$ and the remainder, arbitrarily, are channel messages.

Al m with $u_1=(1110)$ and the remainder, arbitrarily, are channel messages.

There are M(p−1,q,r) channel messages with $u_1=(0000)$

There are M(p−1,q,r) channel messages with $u_1=(1111)$

There are C(p−1,q,r) channel messages with $u_1=(1010)$ where $$C(x,r,z)=2^{4x+2y+z-1}+2^{2x+2y+z-1}$$

In FIGS. 8a, b, c and d it can be seen that (A . . . ), (B . . . ), C( . . . ) and M( . . . ) are defined as $$
\begin{aligned}
A(x,y,z) &= 2^{4x+2y+z} \\
B(y,z) &= 2^{2y+z} \\
C(x,yz) &= 2^{4x+2y+z-1} + 2^{2x+2y+z-1} \\
M(x,y,z) &= 2^{4x+2y+z-1} + 2^{2x+2y+z-2} + 2^{x+y+z-1} \\
invbin_t(s) &= (y_0, y_1, \ldots, y_{t-1}) \\
&\quad \text{if } s = \sum_{i=0}^{t-1} y_i 2^{t-1-i} \\
\text{For } y &= (y_0, y_1, \ldots, y_t), \\
bin(y) &= \sum_{i=0}^{t-1} y_i 2^{t-1-i}
\end{aligned}
$$

For $x=(x0 \ldots x3)$, the function f(x) is defined as the minimum number of positions the vector has to be shifted cyclically anticlockwise such that it matches one of the abovementioned standard vectors:

1000, 1100, 1110, 0000, 1111, 1010. Furthermore, the function g(x) is defined as the minimum number of even positions the vector x has to be shifted cyclically to the left such that it matches one of the following vectors (1000), (0100), (1100), (0110), (1110), (0111), (0000), (1111), (1010), (0101).

The vector $x^{(s)}$ is the result of rotating x over s positions to the left. For a binary vector $z=(z0, z1)$ of two-bit length the function h(z) is defined as the minimum number of positions z has to be shifted cyclically to the left such that it matches one of the following vectors: (00), (11), (10). For each vector we have h(z)=0, except for (0,1), in which case we have h(z)=1.

In the case of a received source data word $m (0 \leq m \leq M(p,q,r)-1)$ the channel data word is $(u_1 \ldots U_p, v_1 \ldots v_q, w_1 \ldots w_r)$ and FIGS. 8z, 8b give the encoding algorithm.

Figure 8C:
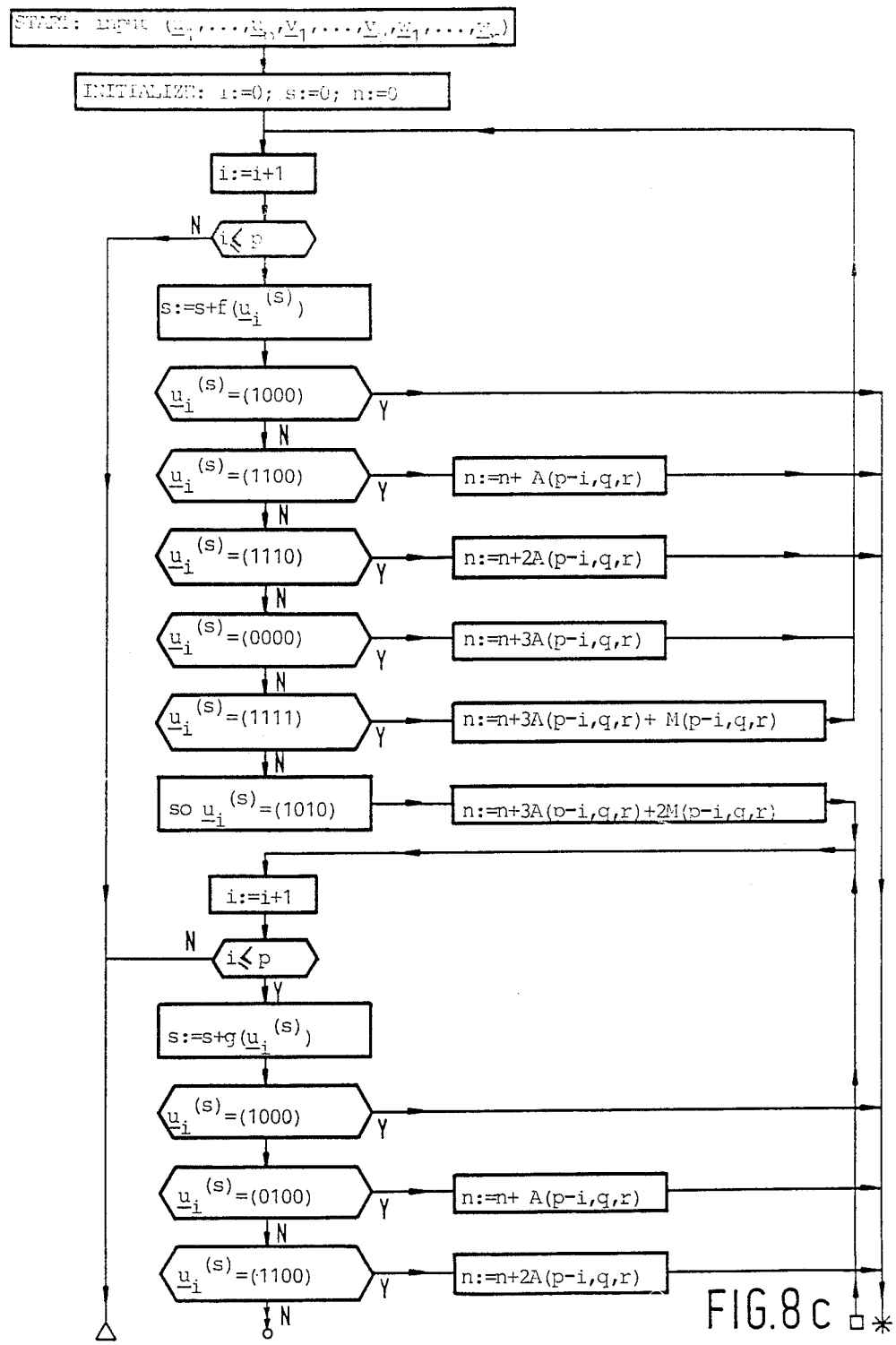
FIGS. 8c, 8d give the decoding for the latter.
Figure 8D:
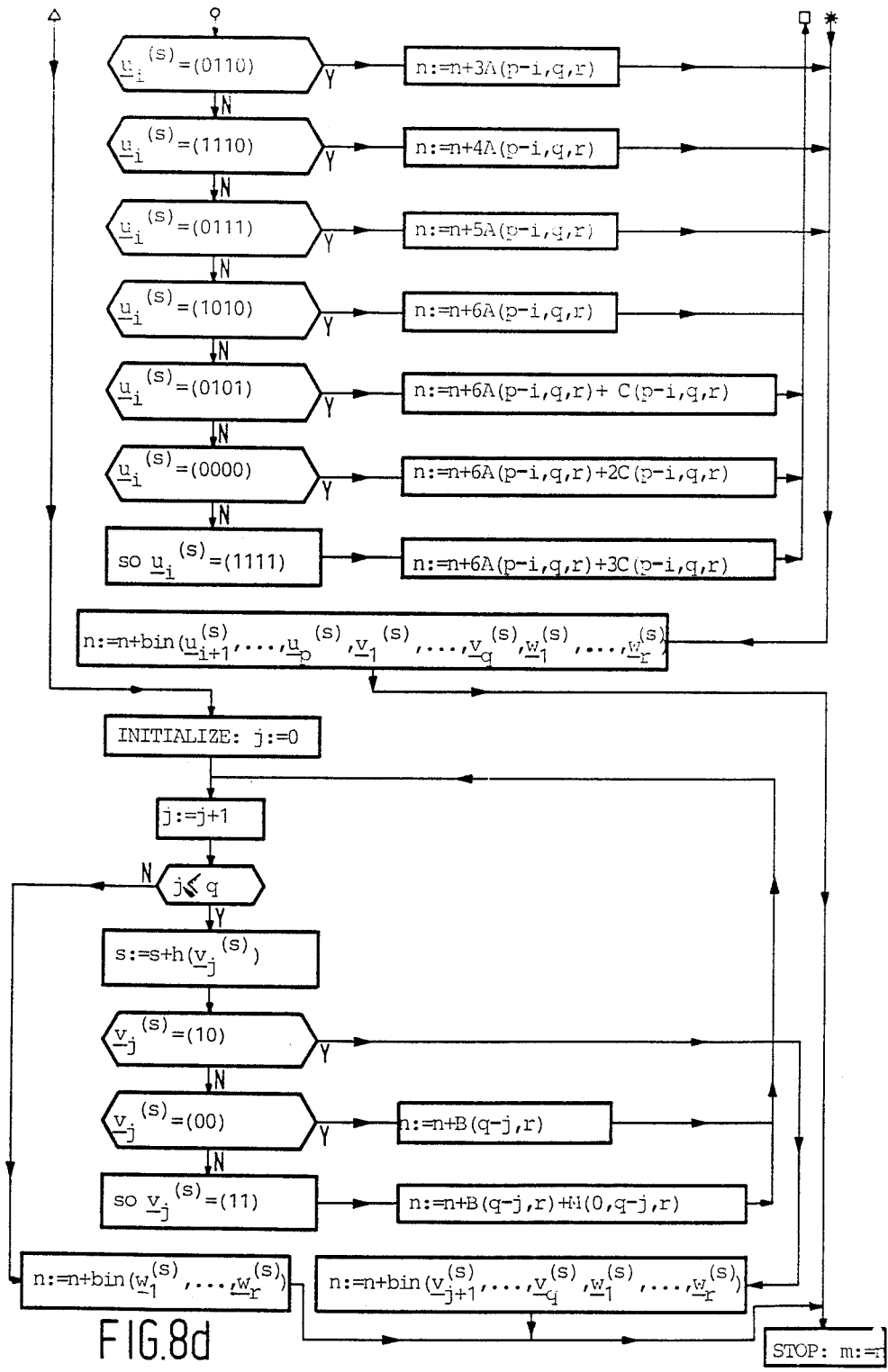

FIGS. 8c, 8d give the decodiang algorithm. As the starting point a rotation of the channel word is received (over a multiple of 90°): $(u_1 \ldots u_p, v_1 \ldots v_q, w_1 \ldots w_r)$, from which the source message word is reconstructed. In this optimum source coding algorithm there are thus fewer than two bits needed to code the orientation.

The structure of the flow charts is in itself conventional, and the quantities used in it have been defined in the foregoing. Between FIGS. 8a and 8b the figures match corresponding ones (circle, star, etc.). In a test the positive and negative outputs are separately indicated. Also indicated are the start and stop blocks.

What is claimed is:

1. A method for identifying an object provided with an identifying code comprising an array of dots shaped as a code field having a predetermined multiplicity of rotational symmetry, which multiplicity lies between two and six, said method comprising the steps of:
    providing an identifying information having n bits together with m additional bits for indicating an actual orientation among said multiplicity;
    encoding said identifying information and additional bits (n+m bits) into a code word that comprises of a plurality of code dot groups arranged within said array, the dot positions in a dot group having the same multiplicity of rotational symmetry as said array, such that mapping of said code word by rotating among said multiplicity will always produce an acceptable code word, said code furthermore possessing error correction capability for at least two bits;
    applying the dots of said code word to an object according to said array;
    picking up said dots from said object and reconstructing said code word without taking into account an actual mapping while invoking said error correction capability; and
    by means of said additional m bits correcting for said mapping if present and delivering said identifying code to a user.

2. A method as claimed in claim 1 wherein said additional m bits are mapped on as many code bits of said code word as are independent of said identifying information.

3. Method as claimed in claims 1 or 2, characterized in that said code is formed from a quasi-cyclic code.

4. Method as claimed in claims 1 or 2, characterized in that said code is formed from a cyclic or shortened cyclic code.

5. A device for identifying an object which is provided with a dot code field, which field has a predetermined multiplicity of rotational symmetry from two to six and includes identification dots, predetermined orientation indicating dots which indicate an actual orientation within said multiplicity, and error protection dots, said dot code representing a code word which comprises a plurality of dot code groups arranged within said dot code field, the dot positions in a dot code group having the same multiplicity of rotational symmetry as said field such that mapping of said code by rotation among said multiplicity always produces an acceptable code word; comprising:
    manipulation means which manipulate said object between feed means and removal means;
    pick-up means which sense dot information of a code field on said object during said manipulation;
    first processing means which multiply said dot information, arranged as a channel word, by a parity check matrix of said code, at an arbitrary orientation within said multiplicity, to form a syndrome;
    second processing means receiving an output of said first processing means, which detect possible bit errors of said code word on the basis of said syndrome and upon detecting a correctable bit error pattern, correct such pattern to produce a reconstructed channel word, and upon detecting an uncorrectable bit error pattern produce an uncorrectability signal;
    detection means receiving an output from said second processing means which detect said orientation indicating dots in said reconstructed channel word, and on the basis of a position thereof, impose a shift on the identification dots which conforms them with a standard orientation within said multiplicity; and
    output means receiving an output from said second processing means and said detection means which output either said uncorrectability signal, if present, or said identification dots which have been conformed to said standard orientation.

6. An object provided with a machine readable and machine error correctable dot code field having a predetermined multiplicity of rotational symmetry which lies between two and six inclusive, said dot code field comprising identification dots, predetermined orientation indicating dots for indicating an actual orientation within said multiplicity, and error protection dots covering both said identification dots and said orientation indicating dots, said dot code representing a code word that comprises a plurality of dot code groups arranged within said dot code field, the dot positions in a dot code group having the same multiplicity of rotational symmetry as said field, such that mapping of said code among said multiplicity would always produce an acceptable code word, said code allowing for multiplying said dot information by a parity matrix of the code at an arbitrary orientation multiplicity to form a syndrome as a basis for detecting possible bit errors of said code words and in case of detecting a correctable bit error pattern, correcting such pattern for thereupon detecting said orientation indicating dots as a basis for imposing a shift on the identification dots to conform to a standard orientation within said multiplicity for outputting in said standard orientation to a user 7. Device as claimed in claim 5, characterized in that said output means contain source decoding means.

* * * * *